April 29, 1969    V. MORRILL, JR    3,441,384
PIPETTE HAVING RELATIVELY FLAT CROSS-SECTION
Filed Nov. 17, 1966
FIG./
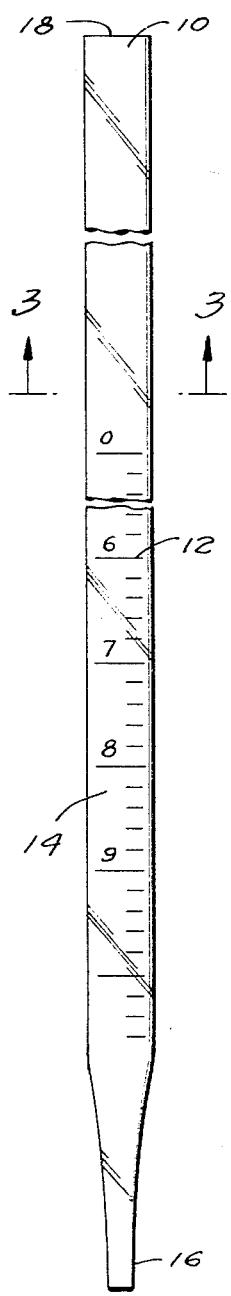
FIG.2
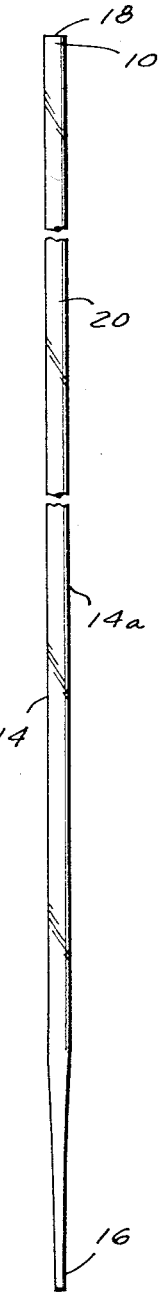
FIG.3
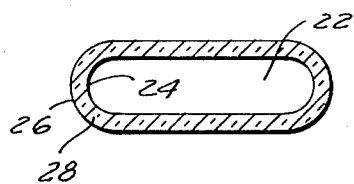
FIG.4
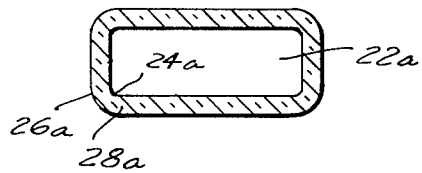
INVENTOR.
VAUGHAN MORRILL, JR.
BY
*Kane, Dalsimer, Kane & Smith*
ATTORNEYS

United States Patent Office

3,441,384
Patented Apr. 29, 1969

---

3,441,384
PIPETTE HAVING RELATIVELY FLAT CROSS-SECTION
Vaughan Morrill, Jr., Creve Coeur, Mo., assignor to Clay-Adams, Inc., New York, N.Y., a corporation of New York
Filed Nov. 17, 1966, Ser. No. 595,116
Int. Cl. B01l 3/00
U.S. Cl. 23—292                                    4 Claims The present invention relates to pipettes and more particularly to a substantially flat pipette.

In laboratory experiments in the fields of chemistry, micro-chemistry and bio-chemistry, it is often required to transport an exact quantity of fluid from one vessel to another. Depending on the nature of the experiment being conducted, the quantity of fluid added or removed is very often critical and a mistake in quantity can lead to confusing if not erroneous or detrimental results. Where the quantities of fluid are relatively small, pipettes are utilized by the technician to facilitate the addition or removal of the fluid.

The typical prior art pipette consists of a hollow cylindrical glass tube. A scale is very often etched or otherwise placed on the surface of the tube. The pipette scale correlates the height of the fluid column to the quantity of fluid contained therein. The technician uses the pipette by sucking an excess quantity of fluid into it and then allowing it to drain to the desired level. By placing his finger over the opening through which the fluid was sucked in, the technician creates a pressure differential across the fluid column which prevents the escape of the fluid until the technician removes his finger. The technician can control the rate of flow through the pipette by varying the pressure which his finger exerts on the open end of the tube.

The diameter of the pipette must be sufficiently large to enable the volumetric scale to be displayed and readily read. In reading the scale, the technician runs into two common problems. First of all, a meniscus will form on the upper end of the fluid column, extending inwardly and downwardly from the outer circumference of the lumen. The presence of the meniscus makes it difficult for the technician to accurately read the scale since the column will be of different heights at different points along the meniscus. This situation is further complicated by the problem of parallax.

In order to produce a broad enough surface on which the scale can be readily displayed, the outside diameter of the pipette must be quite large as compared to the diameter of the lumen, especially when pipettes with small volumetric capacities are being employed. This relatively thick, curved wall produces parallax which further adds to the technician's difficulty in getting a true reading of the quantity of fluid contained within the bore. A reduction in the outer diameter of the pipette would prevent the scale from being conveniently displayed.

The additional glass required to manufacture this type of pipette not only increases the cost of such pipette, but also increases the relative weight of the pipette and the volume occupied by each unit, thus making it more inconvenient to ship and store them. The cylindrical shape of conventional pipettes is also disadvantageous in that the pipette cannot readily be placed on a laboratory table or bench, since it will roll if the lab bench or table has the slightest incline, thus creating a somewhat dangerous condition. In this connection, damage or complete destruction of the pipette may ensue.

It is, therefore, the principal object of this invention to provide a pipette which is substantially free of parallax and which will have a minimum meniscus when filled with a fluid.

Another object is to provide a pipette of this type with a scale sufficiently broad to permit the height of the fluid column to be readily correlated with the scale and the scale to be easily and quickly read.

A further object is to provide a pipette which can be more conveniently packaged and which will not readily roll when placed on flat surfaces.

This and other objects and advantages are most effectively attained by providing a pipette with a substantially flat cross-sectional configuration. In this manner a scale can be advantageously displayed and readily read on one of the flat surfaces with the problem of parallax being substantially completely eliminated by the utilization of relatively thin wall thickness. The present invention contemplates an essentially flat tube open at both ends, one end of the tube may be tapered so as to facilitate the admission and emission of fluid therefrom and the other end would be flame-treated so as to prevent cutting and scratching if placed in the technician's mouth. Even when the pipette is designed to contain a small volumetric capacity, the tube in accordance with this invention provides a relatively broad surface for displaying the scale, and at the same time, the wall thickness of the tube is held at a minimum so that a scale can be easily read with substantially no parallax being encountered.

Other objects and advantages will become apparent from the following detailed description which is to be taken in connection with the accompanying drawing illustrating a somewhat preferred embodiment of the invention, in which:

FIG. 1 is a front elevation of a pipette in accordance with the invention showing a scale prominently displayed;

FIG. 2 is an end elevation thereof;

FIG. 3 is a sectional view taken along line 3—3 of FIG. 1; and

FIG. 4 is a sectional view taken along line 3—3 of FIG. 1 showing an alternate cross-section.

Reference is now made to FIG. 1 in particular, wherein a pipette 10 is shown having a graduated scale 12 suitably imprinted thereon. The pipette is fabricated from glass or other comparable material. The scale is graduated in units of tenths of a milliliter and each tenth is further subdivided into five equal portions. The capacity range is from 0.1 to 1.0 milliliter. The pipette 10 is hollow and contains a lumen 22 of substantially similar cross-section to the overall cross-section as shown in FIGS. 3 and 4 which depict pipette configurations contemplated and preferred by this invention, notably, rectangular and elliptical cross-sectional configurations. The scale 12 is conveniently displayed on the broad flat face of the pipette 10.

Both ends of the pipette are open to the atmosphere. One end 16 is tapered so as to permit the easy admission and emission of fluids contained therein. The opposite end 18 is subjected to a flame so as to make a more convenient mouthpiece and to round off any sharp corners and reduce the hazard of a technician's cutting his mouth when sucking up the fluid. The side panels 20 are relatively thin when compared to the broad face 14 so as to substantially preclude a meniscus extending across the broad faces 14 and 14a.

In order to substantially eliminate parallax when reading the display scale 12 it is necessary that the thickness of the wall 28 measured from the outer surface of the lumen 24 to the outside surface 26 be maintained at approximately one-half a millimeter. This wall thickness will substantially eliminate parallax over the entire range of pipette dimensions discussed below.

In arriving at the dimensioning of the pipette 10, the following criteria should be considered:

(a) The minimum value of the broad face 14 should be sufficiently wide to advantageously display the scale 12; but, the face should not be unduly wide since an overly deep meniscus would result and also for economical reasons.

(b) The thickness of the side panels 20 should be selected to avoid the possibility of a meniscus being created across the depth of the pipette 10, that is, from broad face 14 to broad face 14a; at the same time, however, it must be sufficiently wide to maintain the desired volume of fluid and to be structurally sound.

(c) The thickness of the walls 28 must be sufficiently thin so as not to produce any parallax when a reading of the scale is made. Obviously, the walls must be thick enough to give the pipette sufficient strength to stand the normal use and abuse to which it will be subjected; however, if the pipette wall is made too thick, parallax will be incurred when a reading of the scale is made.

Successful applications of the pipette of this invention embrace the following dimensions: for capacities ranging from 0.1 ml. through 10.0 ml. the ratio of the broad face 14 to the side panels 20 ranged from 3 to 1 for a minimum wall 28 thickness of about one-half a millimeter, side panel 20 dimension ranging from 2 to 15.0 millimeters and broad side 14 dimensions ranging from 5.5 to 15.0 millimeters.

Pipettes embracing these dimensions and construction criteria experienced long life because of minimum damage and breakage by unintentional rolling or otherwise falling off surfaces on which the pipettes were placed. The pipette scales were more easily and accurately read; and precise volumes of liquid were measured and transferred by these pipettes at least to a degree heretofore extremely difficult to achieve.

In summary, the advantages of the pipette of this invention are:

(1) The scale can be advantageously displayed and readily read on one of the flat surfaces;

(2) The scale is much easier to read since the meniscus extends only transversely across the broad width of the pipette. There is substantially no meniscus from front to back. The scale is calibrated so as to read from the low point of the meniscus at the center of the width of the pipette;

(3) Substantially less glass is required for making the pipette; in the ordinary pipette the glass wall is made quite thick in order to provide the proper width for displaying the scale. Due to the flat configuration of the present pipette, ample width is provided for utilizing a very thin wall thickness;

(4) Because of the economy resulting from the use of a small amount of glass, the device is inexpensive and can be disposable;

(5) Won't roll (off lab bench or table);

(6) Flat pipette is easier to hold—fits in hand—better grip;

(7) Lighter (because of less glass). Less fatiguing to hold;

(8) Flat end makes better mouthpiece for sucking up fluid;

(9) Can be stored and/or packaged more easily and in less space; and

(10) Reduced wall thickness virtually eliminates parallax.

Thus, among others, the several aforementioned objects and advantages are most effectively attained. Although only one preferred embodiment of the invention has been disclosed and described in detail herein, it should be understood that the invention is in no sense limited thereby and its scope is to be determined by the appended claims.

I claim:

1. A pipette comprising a transparent tubular portion having an outer predetermined flat configuration and a lumen of substantially similar cross-sectional configuration, the tubular portion having substantially wide and flat faces and interconnecting sides, said tubular portion being tapered at one end and open at both ends, a scale on one of the flat faces, and said tubular portion having walls of predetermined thickness so as to substantially eliminate parallax when viewing a column of fluid contained within said tubular portion.

2. The invention in claim 1 wherein said tubular portions is substantially rectangular in cross-section.

3. The invention in accordance with claim 1 wherein the ratio of width to depth of said tubular portion varies from approximately 1 to 3 within the range of widths between 5.5 millimeters and 15.0 millimeters and depth of 2.0 millimeters and 15.0 millimeters having a minimum wall thickness of approximately one-half a millimeter.

4. The invention in accordance with claim 1 wherein said tubular portion is of a substantially elliptical configuration.

References Cited

UNITED STATES PATENTS

| | | | |
|---|---|---|---|
| 3,233,975 | 2/1966 | McCormick | 23—292 XR |
| 3,286,583 | 11/1966 | Ferrari | 23—292 XR |

MORRIS O. WOLK, *Primary Examiner.*

R. M. REESE, *Assistant Examiner.*